United States Patent
Jany et al.

(10) Patent No.: US 12,155,403 B2
(45) Date of Patent: Nov. 26, 2024

(54) RADIOFREQUENCY-TRANSMITTING DEVICE AND METHOD FOR CONTROLLING SUCH A DEVICE

(71) Applicant: Commissariat à l'Énergie Atomique et aux Énergies Alternatives, Paris (FR)

(72) Inventors: Clément Jany, Grenoble (FR); Michel Durr, Grenoble (FR); Frédéric Hameau, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 45 days.

(21) Appl. No.: 17/630,864

(22) PCT Filed: Jul. 17, 2020

(86) PCT No.: PCT/EP2020/070263
§ 371 (c)(1),
(2) Date: Jan. 27, 2022

(87) PCT Pub. No.: WO2021/018631
PCT Pub. Date: Feb. 4, 2021

(65) Prior Publication Data
US 2022/0302938 A1    Sep. 22, 2022

(30) Foreign Application Priority Data
Jul. 30, 2019   (FR) ...................................... 1908690

(51) Int. Cl.
H04B 1/04      (2006.01)
(52) U.S. Cl.
CPC ................... H04B 1/0483 (2013.01)

(58) Field of Classification Search
CPC ...... H03F 2200/451; H03F 3/245; H03F 3/19; H03F 3/195; H03F 2200/294;
(Continued)

(56) References Cited

U.S. PATENT DOCUMENTS

| | | | |
|---|---|---|---|
| 2015/0139352 A1* | 5/2015 | Matsuo | H04B 17/12 375/295 |
| 2016/0380706 A1* | 12/2016 | Tanzi | H04B 1/525 455/78 |

(Continued)

FOREIGN PATENT DOCUMENTS

| | | |
|---|---|---|
| EP | 2 993 811 A2 | 3/2016 |
| JP | 2016-122895 A | 7/2016 |
| WO | WO 00/03479 A1 | 1/2000 |

OTHER PUBLICATIONS

International Preliminary Report on Patentability for International Application No. PCT/EP2020/070263, mailed Feb. 10, 2022.

(Continued)

*Primary Examiner* — Golam Sorowar
(74) *Attorney, Agent, or Firm* — Wolf, Greenfield & Sacks, P.C.

(57) ABSTRACT

The present description concerns a radio transmission device including a plurality of elementary cells, each including a transmit circuit and an antenna connected to an output terminal of the transmit circuit, each transmit circuit including a power detector coupled to its output terminal, the device further including a control circuit configured to: a) simultaneously activating in transmit mode a first cell, deactivating in transmit mode a second cell, and reading from an output node of the power detector of the second cell a signal representative of a radio frequency power received on the output terminal of the second cell via the antenna of (Continued)

the second cell; and b) deducing from the signal read at step a) information relative to the state of the device or of its environment.

12 Claims, 2 Drawing Sheets

(58) Field of Classification Search
CPC ...... H03F 3/211; H03F 2200/336; H03F 3/21; H03F 3/24; H03F 3/193; H03F 3/68; H03F 1/0227; H03F 1/3205; H03F 2200/462; H03F 1/0211; H03F 2200/465; H03F 2200/105; H03F 1/0222; H03F 1/0277; H03F 3/72; H03F 1/3241; H03F 2200/91; H03F 3/45179; H03F 3/45183; H03F 1/223; H03F 1/3294; H03F 2200/111; H03F 2200/408; H04B 1/0475; H04B 1/525; H04B 1/40; H04B 1/30; H04B 1/0007; H04B 1/04; H04B 1/1036; H04B 1/123; H04B 1/3822; H04B 2001/0408; H04B 2001/0425; H04B 1/006; H04B 1/1018; H04B 1/1638; H04B 1/18; H04B 1/0483; H04B 14/06; H04B 2001/1063; H04B 1/0028; H04B 1/109; H04B 1/0014; H04B 1/0032; H04B 1/44; H04B 1/16; H04B 1/0057; H03G 3/3042; H03G 3/3068; H03G 3/008; H03G 3/3036; H03G 3/001; H03G 1/0088; H03G 3/00; H03G 3/20; H03G 3/3078; H03G 3/3089; H03G 3/3047; H03G 3/3052

See application file for complete search history.

(56) References Cited

U.S. PATENT DOCUMENTS

2020/0067466 A1\* 2/2020 Kushnir .................. H03F 3/245
2020/0266777 A1\* 8/2020 Arfaei Malekzadeh ....................
H03F 1/3247

OTHER PUBLICATIONS

International Search Report and Written Opinion for International Application No. PCT/EP2020/070263, mailed Nov. 4, 2020.

\* cited by examiner

RADIOFREQUENCY-TRANSMITTING DEVICE AND METHOD FOR CONTROLLING SUCH A DEVICE

This Application is a national stage filing under 35 U.S.C. § 371 of International Patent Application Serial No. PCT/EP2020/070263, filed Jul. 17, 2020, which claims priority to French patent application FR19/08690, filed Jul. 30, 2019. The contents of these applications are incorporated herein by reference in their entireties.

TECHNICAL BACKGROUND

The present disclosure generally concerns radio transmission devices. It more particularly aims at a radio transmission device comprising a plurality of elementary transmission cells, and a method of controlling such a device.

PRIOR ART

Devices comprising a plurality of elementary radio transmission cells forming a radio transmission network have already been provided, for example for communication applications, radar applications, or also imaging applications. Each elementary transmission cell conventionally comprises a transmit circuit and an antenna connected to an output terminal of the transmit circuit.

It would be desirable to at least partly improve one or a plurality of aspects of known radio transmission devices.

SUMMARY

For this purpose, an embodiment provides a radio transmission device comprising a plurality of elementary cells, each comprising a transmit circuit and an antenna connected to an output terminal of the transmit circuit, each transmit circuit comprising a power detector specific to the cell, having an input node coupled to the output terminal of the cell transmit circuit, and an output node specific to the cell, the device further comprising a control circuit configured to, during an operating phase, implement the steps of:
  a) simultaneously activating in transmit mode a first cell of the plurality of cells, deactivating in transmit mode a second cell of the plurality of cells, and reading from an output node of the power detector of the second cell a signal representative of a radio frequency power received on the output terminal of the second cell via the antenna of the second cell; and
  b) deducing from the signal read at step a) information relative to the state of the device or of its environment.

According to an embodiment, the information deduced at step b) characterizes an energy transfer between the antennas of the first and second cells.

According to an embodiment, the output nodes of the power detectors of the different elementary cells are electrically insulated from one another.

According to an embodiment, the control circuit is configured to, at step b), compare the signal read at step a) with a predetermined threshold.

According to an embodiment, the control circuit is configured to implement, after step a), the step of:
  a') simultaneously activating in transmit mode the second cell, deactivating in transmit mode the first cell, and reading from the output node of the power detector of the first cell a signal representative of a radio frequency power received on the output terminal of the first cell via the antenna of the first cell.

According to an embodiment, the control circuit is further configured to, after step a'), compare the signal read at step a') with the signal read at step a).

According to an embodiment, the control circuit is configured to repeat steps a) and b) for all the combinations of two cells of said plurality of cells.

According to an embodiment, in each cell, the power detector is adapted to delivering on its output node a signal representative of the average of the square of the voltage present on the output terminal of the transmit circuit of the cell.

According to an embodiment, in each cell, the transmit circuit comprises a radio frequency signal generator and an amplifier coupling an output node of the generator to the output terminal of the transmit circuit.

According to an embodiment, in each cell, the radio frequency signal generator comprises a local oscillator and a mixer adapted to modulating an output signal of the local oscillator.

According to an embodiment, the cells of the plurality of cells are assembled on a same printed circuit board.

Another embodiment provides a method of controlling a radio transmission device comprising a plurality of elementary cells, each comprising a transmit circuit and an antenna connected to an output terminal of the transmit circuit, each transmit circuit comprising a power detector specific to the cell, having an input node coupled to the output terminal of the transmit circuit of the cell, and an output node specific to the cell, the method comprising the steps of:
  a) simultaneously activating in transmit mode a first cell of said plurality of cells, deactivating in transmit mode a second cell of said plurality of cells, and reading from an output node of the power detector of the second cell a signal representative of a radio frequency power received by the output terminal of the second cell via the antenna of the second cell; and
  b) deducing from the signal read at step a) information relative to the state of the device or of its environment.

According to an embodiment, the information deduced at step b) characterizes an energy transfer between the antennas of the first and second cells.

According to an embodiment, the output nodes of the power detectors of the different elementary cells are electrically insulated from one another.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DESCRIPTION OF THE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the forming of the various elements of the elementary transmission cells of the described devices has not been detailed, the forming of these elements being within the abilities of those skilled in the art based on the indications of the present description.

Unless specified otherwise, when reference is made to two elements connected together, this signifies a direct connection without any intermediate elements other than conductors, and when reference is made to two elements coupled together, this signifies that these two elements can be connected or they can be coupled via one or more other elements.

Unless specified otherwise, the expressions "around", "approximately", "substantially" and "in the order of" signify within 10%, and preferably within 5%.

Radio frequency signals or waves here means radio signals or waves having a spectrum in the range from 3 kHz to 300 GHz. The described embodiments are particularly advantageous for devices intended to transmit at millimeter-range wavelengths, for example, at frequencies in the range from 30 to 300 GHz.

Figure 1:
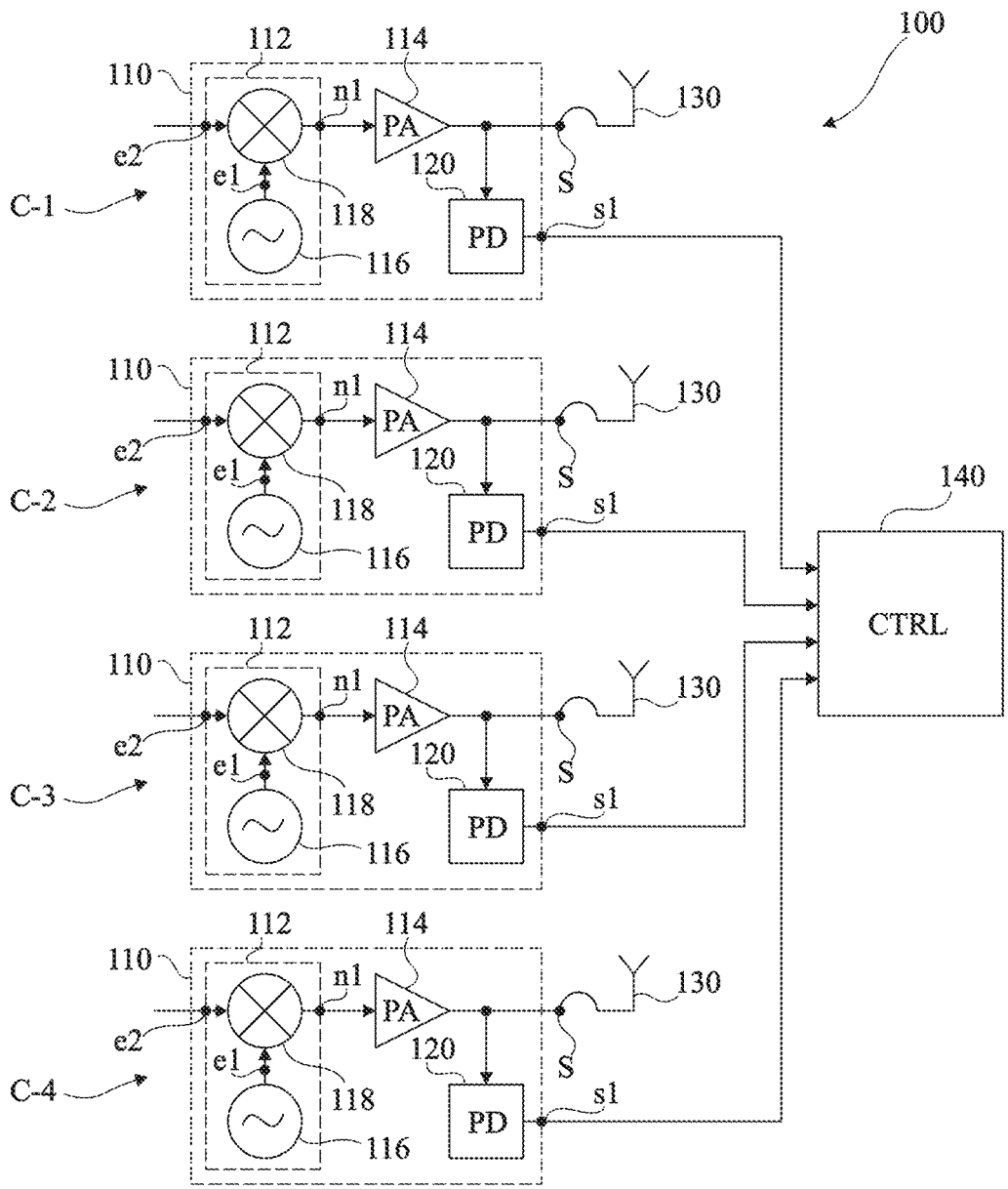
FIG. 1 is a simplified electric diagram of an example of a radio transmission device according to an embodiment.

FIG. 1 is a simplified electric diagram of an example of a radio transmission device 100 according to an embodiment. The device 100 of FIG. 1 is for example intended to be used to locally irradiate a user's skin, for medical or comfort purposes.

The device 100 of FIG. 1 comprises n elementary transmission cells $C\_i$, n being an integer greater than or equal to 2 and i an integer in the range from 1 to n. In the example of FIG. 1, device 100 comprises n=4 elementary transmission cells $C\_1$, $C\_2$, $C\_3$, and $C\_4$. The n cells $C\_i$ of device 100 are for example identical (to within manufacturing dispersions).

Each cell $C\_i$ comprises a transmit circuit 110 and an antenna 130 connected to an output terminal S of transmit circuit 110. Each transmit circuit 110 is for example integrated in an elementary semiconductor chip specific to the cell, having the antenna 130 of the cell connected thereto. The n cells $C\_i$ are for example assembled on a same printed circuit board. In this example, each transmit circuit 110 comprises a radio frequency signal generator 112 adapted to delivering a radio frequency signal on an output node n1. Each circuit 110 further comprises a power amplifier 114 (PA) having an input node coupled, for example, connected, to the output node n1 of generator 112, and an output node coupled, for example, connected, to the output terminal S of circuit 110. Amplifier 114 is adapted to amplifying the radio frequency signal delivered by generator 112 for its transmission by antenna 130. In each transmit circuit 110, generator 112 comprises at least one local oscillator 116 delivering an oscillating signal at a frequency in the order of the central transmission frequency of the cell, for example, a frequency in the range from 30 to 300 GHz, for example, a frequency in the order of 60 GHz. Each generator 112 may further comprise a mixer 118 adapted to modulating the signal delivered by oscillator 116. More particularly, in the shown example, mixer 118 comprises an input node e1 coupled, for example connected, to an output node of oscillator 116, and an output node coupled, for example connected, to the output node n1 of generator 112. In the example of FIG. 1, mixer 118 further comprises an input node e2 intended to receive a modulation signal. The radio frequency signal delivered at the output of mixer 118 then corresponds to the signal delivered by local oscillator 116, modulated by the signal applied on the input e2 of mixer 118. As an example, the modulation signal applied to node e2 is a binary periodic signal or square signal, mixer 118 transmitting the output signal of oscillator 116 substantially identically on node n1 when the modulation signal is in a first state, for example, a high state, and delivering no signal on node n1 when the modulation signal is in a second state, for example, a low state. In other words, in this example, mixer 118 behaves as a switch controlled by the modulation signal applied to node e2. As an example, the frequency of the modulation signal is in the range from 100 to 10,000 Hz, for example, in the order of 1,000 Hz. The duty cycle of the modulation signal may be adjusted to control the average power of the radio frequency signal delivered by cell $C\_i$.

In this example, each transmit circuit 110 further comprises a specific power detector 120 (PD) having an input node coupled, for example, connected, to the output terminal S of circuit 110. Power detector 120 is adapted to delivering, on an output node s1, a signal (for example, a DC voltage) representative of the power of the radio frequency signal delivered by circuit 110 on its output terminal S. Specific here means that the power detectors 120 of the different cells are distinct from one another and have respective output nodes isolated from one another.

As an example, circuit 120 is configured to deliver on its node s1 a signal only based on a measurement of the voltage present on the output terminal S of circuit 110. As an example, circuit 120 is configured to deliver on its node s1 a signal representative of the amplitude of the envelope of the voltage present on the output terminal S of circuit 110. As an example, circuit 120 is configured to deliver on its node s1 a signal representative of the average of the square of the voltage present on the output terminal S of circuit 110.

Power detector circuit 120 enables to know the power of the radio frequency signal effectively transmitted to the outside of the cell, which may significantly vary according to the environment of the cell. In normal operation, a feedback may be provided to adapt a transmit power set point for the circuit 110 of the cell according to the power measurement provided by the power detector circuit 120 of the cell. Further or as variant, in each cell $C\_i$, power detector circuit 120 may be used during a phase of cell testing, to detect a possible failure of the cell, for example, an impedance matching defect between the transmit circuit 110 and the antenna 130 of the cell, or a misconnection between the transmit circuit 110 and the antenna 130 of the cell.

In the example of FIG. 1, device 100 further comprises a control circuit 140 (CTRL). Circuit 140 may comprise a microcontroller. As a variant, control circuit 140 is fully analog. In the shown example, control circuit 140 comprises n input terminals coupled, for example, connected, respectively to the n output nodes s1 of the power detector circuits 120 of the n cells $C\_i$ of the device. Control circuit 140 is adapted to reading and processing the output signals of the power detectors 120 of cells $C\_i$. Control circuit 140 is further adapted to controlling the activation/the deactivation in transmit mode of the cells $C\_i$ and/or to controlling the average transmission power of cells $C\_i$. As an example, control circuit 140 may be adapted to delivering, via n distinct output terminals, not detailed in the drawing, the n modulation signals applied to the input terminals e2 of the mixers 118 of the n cells $C\_i$ of the device.

In normal operation, device 100 may be controlled, via control circuit 140, so that the n elementary transmission cells $C\_i$ of the device simultaneously transmit radio frequency signals.

According to an aspect of an embodiment, control circuit 140 is further adapted to, during a test phase, simultaneously:

activate in transmit mode a first elementary cell of the assembly of n cells $C\_i$;

deactivate in transmit mode a second elementary cell of the assembly of n cells $C\_i$; and read from the output of the power detector 120 of the second cell a signal representative of the radio frequency power received on the output terminal S of the second cell.

When the first cell transmits a radio frequency signal, part of the power of this signal is transmitted, by coupling, to the antenna 130 of the second cell. The second cell being deactivated in transmit mode, that is, controlled so that its transmit circuit 110 delivers no radio frequency signal on its output terminal S, the radio frequency power detected on the terminal S of the second cell by its power detector 120 is representative of the radio frequency power received via the antenna 130 of the second cell, from the first cell. It is here provided to use this inter-cell coupling path to test the state of device 100 or of its environment. In other words, it is provided to use the power detector 120 of a cell inactive in transmit mode as a receiver of a signal transmitted by a cell active in transmit mode, to test the state of device 100 or of its environment. As an example, the output signal of the power detector 120 of the cell inactive in transmit mode is compared with one or a plurality of thresholds to determine information relative to the state of the device or of its environment.

The above-mentioned operation mode may for example be used to test the operation of the elementary cells of the device and particularly the state of the connections between the transmit circuits 110 and the antennas 130 of the cells of the device. As an example, it may be provided, during a test phase, to activate in transmit mode a single first cell of the device, and to compare with a predetermined threshold the output signal of the power detector 120 of a second cell of the device, distinct from the first cell. If the output signal of the power detector 120 of the second cell is greater than the threshold, it can be deduced that the first and second cells are functional, and particularly that the quality of the connections between the transmit circuit 110 and the antenna 130 of each of the first and second cells is satisfactory. In the opposite case, it can be deduced that at least one of the first and second cells is defective, for example, with a misconnection between the transmit circuit 110 and the antenna 130 of the cell. An alert may then for example be transmitted to a user of the device, via a user interface, not detailed. The test may then be repeated sequentially for one or a plurality of other pairs of cells of the device, for example, for all the combinations of two cells of the device, to test all the cells of the device and, should the case arise, locate the defective cells.

As a variant, the above-mentioned operation may be used to determined information relative to the environment of device 100, for example, properties of the medium surrounding device 100. Indeed, the power detected by the power detector 120 of the cell inactive in transmit mode, or receiving cell, depends on the properties of the transmission channel separating the antenna from the receiving cell of the antenna of the cell active in transmit mode, or transmitting cell, and, more generally, on the properties of the immediate environment of the two antennas. As an example, in the case of a device intended to be placed against a user's skin, the above-mentioned operating mode may be used to determine information relative to the humidity rate of the skin, which information may for example be used to estimate the user's emotional state and accordingly adapt the radio frequency power emitted by the device.

To improve the accuracy of the determined information, differential measurements may be implemented. For example, for each pair of tested cells, it may be provided to perform a first measurement by simultaneously activating in transmit mode a first cell in the pair and in receive mode the second cell in the pair, and then a second measurement by simultaneously activating in transmit mode the second cell in the pair and in receive mode the first cell in the pair. The two measurements may then be compared to refine the accuracy of the determined information.

By generalizing the differential measurement for systems comprising a large number of elementary cells, for example, at least 9 elementary cells, for example arranged in an array of rows and columns, a mapping of the transmissions for all the pairs of cells of the device can be established. A processing of these transmission data may be implemented by control circuit 140, for example by a tomography method, to provide information relative to the state of the environment of the device at several points, or the location of defects in the device.

As a variant, it may be provided to simultaneously activate a plurality of cells in transmit mode and a single cell in receive mode, or to simultaneously activate a plurality of cells in transmit mode and a plurality of cells in receive mode, or also to simultaneously activate a single cell in transmit mode and a plurality of cells in receive mode.

Figure 2:
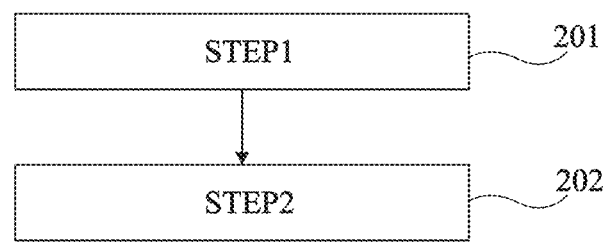
FIG. 2 illustrates an example of a method of controlling a radio transmission device according to an embodiment.

FIG. 2 illustrates an example of a method of controlling a radio frequency transmission device of the type described in relation with FIG. 1, during a phase of testing of the state of the device or of its environment.

The method of FIG. 2 comprises a first step 201 (STEP1) during which the device is controlled to, simultaneously:

activate in transmit mode a first elementary cell of the assembly of n cells $C\_i$;

deactivate in transmit mode a second elementary cell of the assembly of n cells $C\_i$; and reading from the output of the power detector 120 of the second cell a signal representative of the radio frequency power received on the output terminal S of the transmit circuit of the second cell.

During this step, the other cells of the device may be deactivated in transmit and in receive mode.

The method of FIG. 2 further comprises, after step 201, a step 202 (STEP2) during which the signal read at step 201 from the output of the power detector 120 of the second cell is analyzed by an electronic processing device, for example, the control circuit 140 of device 100, to deduce therefrom information relative to the state of device 100 or of its environment. During this step, the output signal of the power detector 120 of the second cell may for example be compared with one or a plurality of predetermined thresholds.

Steps 201 and 202 may be repeated for different pairs of cells of the device, for example, for all the combinations of two cells of the device.

To improve the accuracy of the determined information, steps 201 and 202 may be repeated a plurality of times by modifying at each iteration the transmission frequency and/or the transmission power, to scan a plurality of transmission frequencies and/or a plurality of distinct transmission powers.

As a variant, the above-mentioned method may be used to adjust the transmission parameters, particularly the transmission frequency and/or the transmission power of the cell activated in transmit mode. As an example, it may be provided to search, by successive iterations, for settings tending towards the obtaining of a maximum ratio of the power detected by the power detection circuit of the deactivated cell in transmit mode to the power transmitted by the cell activated in transmit mode.

Various embodiments and variants have been described. Those skilled in the art will understand that certain features of these various embodiments and variants may be combined, and other variants will occur to those skilled in the art. In particular, the described embodiments are not limited to the above-described specific example of application to a device intended to be used to locally irradiate a user's skin, for medical or comfort purposes. More generally, the above-described operation may be adapted to any device comprising a plurality of elementary radio frequency transmission cells forming a radio frequency transmission network, for example, for communication, radar, or imaging applications.

Further, the described embodiments are not limited to the examples of elementary radio frequency transmission cells described in relation with FIG. 1. It should in particular be noted that according to the considered application, the mixers 118 of the transmit circuits 110 of the cells of FIG. 1 may be omitted, the output of the local oscillator 116 of each cell then being directly connected to the input of the power amplifier 114 of the cell.

Further, in the above-described examples, the activation/the deactivation in transmit mode of an elementary cell C_i may be performed by varying the modulation signal applied to the input e2 of the transmit circuit 110 of the cell. The described embodiments are however not limited to this specific case. More generally, cells C_i may be equipped with any other means of activation/deactivation in transmit mode controllable via control circuit 140.

Further, the described embodiments are not limited to the described examples where the power detector 120 of each cell measures the radio frequency power on the output terminal S of the cell from the sole measurement of the voltage on the terminal S of the cell. More generally, any known power detector circuit may be used to measure the radio frequency power on the output terminal S of each cell, for example, a circuit based on voltage and current measurements on terminal S.

Embodiments where an output signal of the power detector of a cell deactivated in transmit mode is analyzed, when another cell is simultaneously activated in transmit mode, to deduce therefrom information relative to the state of the transmit device or of its environment, have been mainly described hereabove.

It should however be noted that information may also be deduced from the analysis of the output signal of the power detector of a cell activated in transmit mode. In particular, the analysis of an output signal of the power detector 120 of a cell activated in transmit mode may enable, by comparison with predetermined reference signals, for example, with signals stored during a previous calibration phase, to obtain information relative to the environment of this cell. In the case of a device for irradiating a user's skin, the analysis of the output signal of the power detector of a cell activated in transmit mode may for example enable to determine whether the device is correctly applied against the skin. To refine the accuracy of the determined information, the measurement of the output signal of the power detector of a cell activated in transmit mode may be repeated a plurality of times by controlling the cell activated in transmit mode to scan a plurality of transmission frequencies and/or a plurality of distinct transmission powers.

Figure 3:
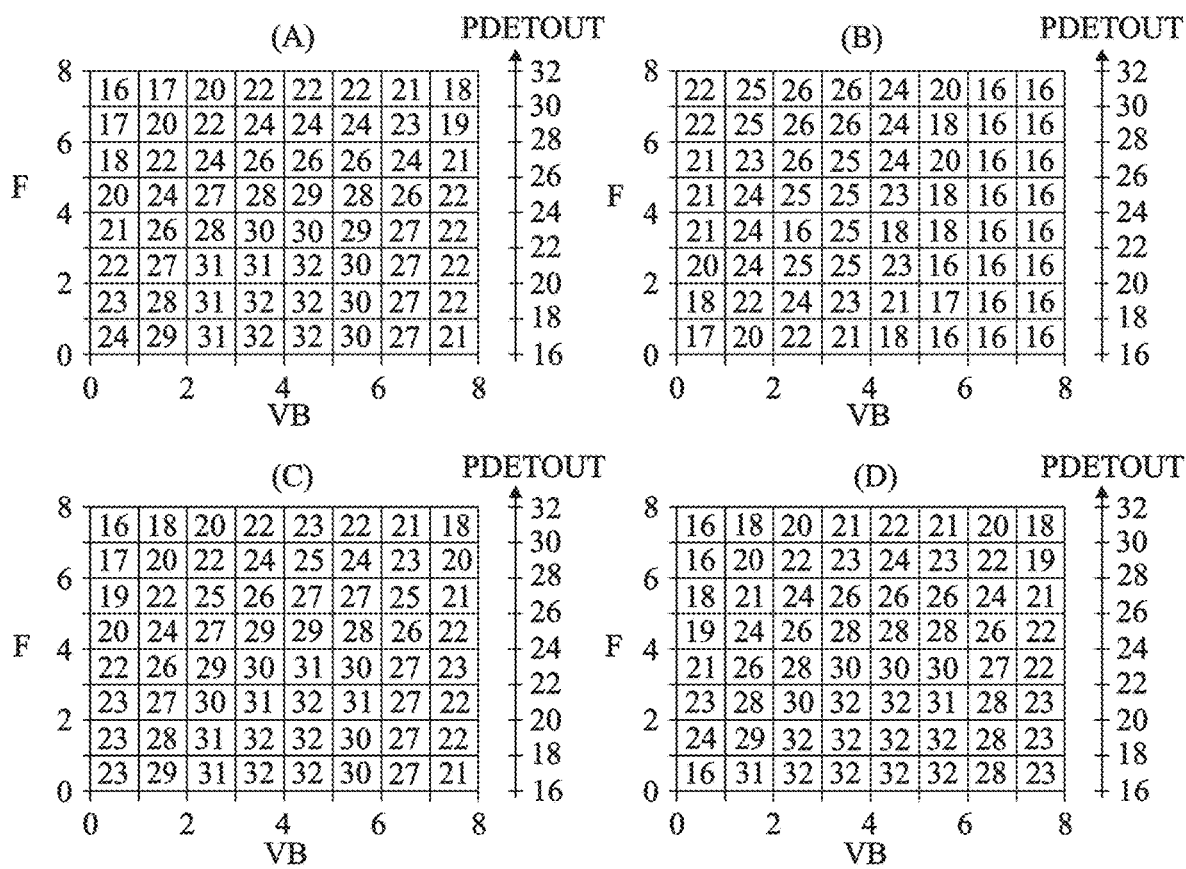
FIG. 3 illustrates an example of use of a radio transmission device.

FIG. 3 shows, as an illustrative example, output signals of the power detector of a cell activated in transmit mode in four distinct configurations (A), (B), (C), and (D). For each of the four configurations (A), (B), (C), and (D), FIG. 3 shows a diagram representing a power PDETOUT measured by the power detector of the cell, according to a transmit frequency F of the cell (in ordinates) and to a bias voltage VB (in abscissas) of the power amplifier 114 of the transmit circuit 110 of the cell (it being understood that, in this example, bias voltage VB determines the cell transmission power).

The configuration (A) of FIG. 3 corresponds to a case where the transmission device is whole and surrounded with air. The configuration (B) of FIG. 3 corresponds to a case where the antenna 130 of the considered transmission cell has been removed. The configuration (C) of FIG. 3 corresponds to a case where the transmission device is whole and correctly applied against a user's skin. The configuration (D) of FIG. 3 corresponds to a case where the transmission device is whole and applied against a metal plate.

As shown in FIG. 3, it can be observed that response of the power detector of the cell varies according to the conditions of use of the device. By comparing the response of the power detector with predetermined reference signatures, for example, generated by training during a prior calibration phase, it can be determined in which conditions the transmission device is placed.

A feedback may be provided to adapt a frequency set point and/or transmission power of the cell circuit 110, according to the power measurement provided by its power detector circuit 120.

In the case of a device of irradiation of a user's skin, the analysis of the output signals of the power detector of a cell activated in transmit mode may further enable to determine information relative to the subject's emotional state, which has an influence on the electric conductivity of their skin, such as described in particular in the article entitled "Human sweat ducts as helical antennas in the sub-THz frequency range—an overview" of A. Kochnev et al. (IEEE Transactions on Terahertz Science and Technology, Vol. 11, N° 2, June 2018).

The invention claimed is:

1. Radio transmission device comprising a plurality of elementary cells, each comprising a transmit circuit and an antenna connected to an output terminal of the transmit circuit, each transmit circuit comprising a power detector specific to the cell, having an input node coupled to the output terminal of the cell transmit circuit, and an output node specific to the cell, the device further comprising a control circuit configured to, during an operating phase, implement the steps of:
   a) simultaneously activating in transmit mode a first cell of said plurality of cells, deactivating in transmit mode a second cell of said plurality of cells, and reading directly on the output node of the power detector of the second cell a signal representative only of a radio frequency power received on the output terminal of the second cell via the antenna of the second cell; and
   b) deducing from the signal read at step a) information relative to a state of the device or of its environment,
   wherein said information deduced at step b) characterizes a power transfer between the antennas of the first and second cells,
   wherein the control circuit is configured to implement, after step a), the step of:
   a') simultaneously activating in transmit mode the second cell, deactivating in transmit mode the first cell, and reading from the output node of the power detector of the first cell a signal representative of a radio frequency power received on the output terminal of the first cell via the antenna of the first cell.

2. Device according to claim 1, wherein the output nodes of the power detectors of the plurality of elementary cells are electrically insulated from one another.

3. Device according to claim 1, wherein the control circuit is configured to, at step b), compared the signal read at step a) with a predetermined threshold.

4. Device according to claim 1, wherein the control circuit is further configured to, after step a'), compare the signal read at step a') with the signal read at step a).

5. Device according to claim 1, wherein the control circuit is configured to repeat steps a) and b) for any pair of cells of said plurality of cells.

6. Device according to claim 1, wherein, in each cell, the transmit circuit comprises a radio frequency signal generator and an amplifier coupling an output node of the generator to the output terminal of the transmit circuit.

7. Device according to claim 6, wherein in each cell, the radio frequency signal generator comprises a local oscillator and a mixer adapted to modulating an output signal of the local oscillator.

8. Device according to claim 1, wherein the cells of said plurality of cells are assembled on a same printed circuit board.

9. Method of controlling a radio transmission device comprising a plurality of elementary cells, each comprising a transmit circuit and an antenna connected to an output terminal of the transmit circuit, each transmit circuit comprising a power detector specific to the cell, having an input node coupled to the output terminal of the transmit circuit of the cell and an output node specific to the cell, the method comprising the steps of:

a) simultaneously activating in transmit mode a first cell of said plurality of cells, deactivating in transmit mode a second cell of said plurality of cells, and reading directly on the output node of the power detector of the second cell a signal representative only of a radio frequency power received by the output terminal of the second cell via the antenna of the second cell; and b) deducing from the signal read at step a) information relative to a state of the device or of its environment, wherein the control circuit is configured to implement, after step a), the step of:

a') simultaneously activating in transmit mode the second cell, deactivating in transmit mode the first cell, and reading from the output node of the power detector of the first cell a signal representative of a radio frequency power received on the output terminal of the first cell via the antenna of the first cell.

10. Method according to claim 9, wherein said information deduced at step b) characterizes an energy transfer between the antennas of the first and second cells.

11. Method according to claim 9, wherein the output nodes of the power detectors of the plurality of elementary cells are electrically insulated from one another.

12. Radio transmission device comprising a plurality of elementary cells, each comprising a transmit circuit and an antenna connected to an output terminal of the transmit circuit, each transmit circuit comprising a power detector specific to the cell, having an input node coupled to the output terminal of the cell transmit circuit, and an output node specific to the cell, the device further comprising a control circuit configured to, during an operating phase, implement the steps of:

a) simultaneously activating in transmit mode a first cell of said plurality of cells, deactivating in transmit mode a second cell of said plurality of cells, and reading directly on the output node of the power detector of the second cell a signal representative only of a radio frequency power received on the output terminal of the second cell via the antenna of the second cell; and b) deducing from the signal read at step a) information relative to a state of the device or of its environment, wherein said information deduced at step b) characterizes a power transfer between the antennas of the first and second cells, wherein, in each cell, the power detector is adapted to delivering on its output node a signal representative of the average of the square of the voltage present on the output terminal of the transmit circuit of the cell.

* * * * *